United States Patent [11] 3,602,739

[72] Inventor Tamas I. Pattantyus
Pittsburgh, Pa.
[21] Appl. No. 816,501
[22] Filed Apr. 16, 1969
[45] Patented Aug. 31, 1971
[73] Assignee Westinghouse Electric Corporation
Pittsburgh, Pa.

[54] DIGITAL MAGNETIC RECORDING CIRCUIT BIDIRECTIONAL LOAD SWITCHING HAVING HIGHER LOAD VOLTAGE AT TIME OF REVERSAL
4 Claims, 2 Drawing Figs.

[52] U.S. Cl. .......... 307/254, 307/270
[51] Int. Cl. .......... H03k 17/64, H03k 17/66
[50] Field of Search .......... 307/254, 270

[56] References Cited
UNITED STATES PATENTS

| | | | |
|---|---|---|---|
| 2,821,639 | 6/1958 | Bright | 307/254 |
| 3,174,058 | 3/1965 | Xylander | 307/254 |
| 3,182,210 | 5/1965 | Jebens | 307/254 |
| 3,378,699 | 4/1968 | Bruinsma | 307/254 |

*Primary Examiner*—Donald D. Forrer
*Assistant Examiner*—Harold A. Dixon
*Attorneys*—F. H. Henson, C. F. Renz and A. S. Oddi

ABSTRACT: A circuit is disclosed for reversing the current through an inductive element, such as a coil of a magnetic recording head used for digital recording, wherein two pairs of translating devices, such as transistors, are utilized with the inductive element being connected between a first device of each pair so that current flows from a first operating voltage source in opposite directions through the inductive element depending upon which device is conductive. The second device of the respective pairs is turned on when the current through the inductive element is to be reversed so as to connect a second operating voltage source to the inductive element and cause the rapid reversal of current therethrough.

PATENTED AUG 31 1971 3,602,739

WITNESSES

Theodore F. Wrobel

James F. Young

INVENTOR

Tamas I. Pattantyus

BY

ATTORNEY

DIGITAL MAGNETIC RECORDING CIRCUIT BIDIRECTIONAL LOAD SWITCHING HAVING HIGHER LOAD VOLTAGE AT TIME OF REVERSAL

BACKGROUND OF THE INVENTION

1. Field of the Invention

The present invention relates to circuitry for reversing the current through an inductive element and, more particularly, wherein the inductive element may comprise a magnetic recording element utilized for digital recording.

2. Discussion of the Prior Art

A commonly used form of magnetic recording desirable for use in digital applications is the so-called "Nonreturn to Zero" type of recording. In this type of recording, the current through the magnetic recording head or other inductive element is changed between equal positive and negative values but not being held at a zero value during the recording operation. The magnitude of the current in both directions must be sufficient to saturate the magnetic recording media and the switching rate of current from one direction to the other must be sufficiently high to accommodate the rate at which the digital information is to be recorded. Because of the finite inductance of the magnetic recording head or other inductive elements, the rate at which the current may be switched between positive and negative values is limited. Moreover, when employing transistor or other semiconductor circuitry, the magnitude of the operating voltage utilized to supply the recording current is limited by the voltage rating of the device which thus also limits how rapidly the current may be reversed.

Prior art digital recording circuits, such as shown in U.S. Pat. No. 3,125,759, employ two switching devices with the recording head being connected therebetween and the current direction being reversed by switching the respective devices on and off. The two-device circuit suffers from the defects as discussed above of prohibiting the very rapid switching of the current due to the finite inductance of the recording head and also due to the fact that a single voltage source limited to the voltage rating of the device must be employed.

SUMMARY OF THE INVENTION

Broadly, the present invention provides a circuit for rapidly reversing the current through an inductive element with two pairs of switching devices being utilized so that two operating voltage sources are switched across the inductive element when it is desired to change from one current direction to the other.

DESCRIPTION OF THE PREFERRED EMBODIMENT

Figure 1:
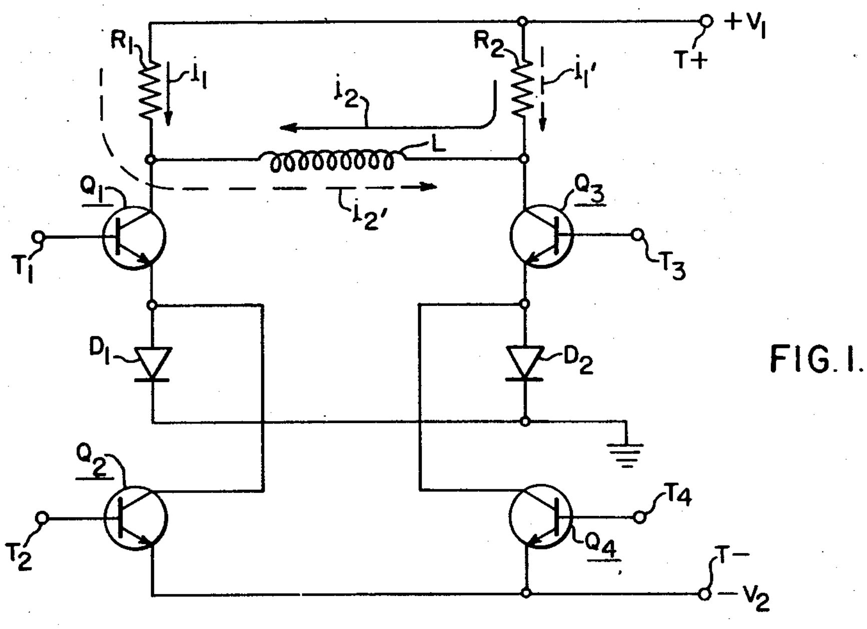
FIG. 1 is a schematic diagram of the circuit of the present invention.

In FIG. 1 a circuit is shown for rapidly changing the current through an inductive element L, which may comprise, for example, the coil of a magnetic recording head. As shown the circuit includes , switching devices illustrated as transistors $Q_1Q_2$, $Q_3$ and $Q_4$. The inductive element L is connected between the collector electrodes of the transistors $Q_1$ and $Q_3$. The transistors $Q_1$, $Q_2$, $Q_3$ and $Q_4$, respectively, are provided with base terminals $T_1$, $T_2$, $T_3$ and $T_4$, which supply input switching pulses to the base electrodes thereof. The switching pulses for the transistors $Q_1$, $Q_3$, $Q_2$ and $Q_4$, respectively, are shown in curves A, B, C and D of FIG. 2. A source of positive operating potential $+V_1$ is provided and applied to the terminal T+ which is connected via a resistor $R_1$ and a resistor $R_2$ to the collector electrodes of the transistors $Q_1$ and $Q_3$, respectively. The emitter electrodes of the transistors $Q_1$ and $Q_3$ are, respectively, connected to the collector electrodes of the transistors $Q_2$ and $Q_4$. A source of negative operating potential $-V_2$ is provided and applied to a terminal T− to which the emitter electrodes of the transistors $Q_2$ and $Q_4$ are connected. The emitter electrodes of the transistors $Q_1$ and $Q_3$ are, respectively, connected to a ground reference potential via a diode $D_1$ and a diode $D_2$, which are connected from anode to cathode between the emitter electrodes and ground.

Figure 2:
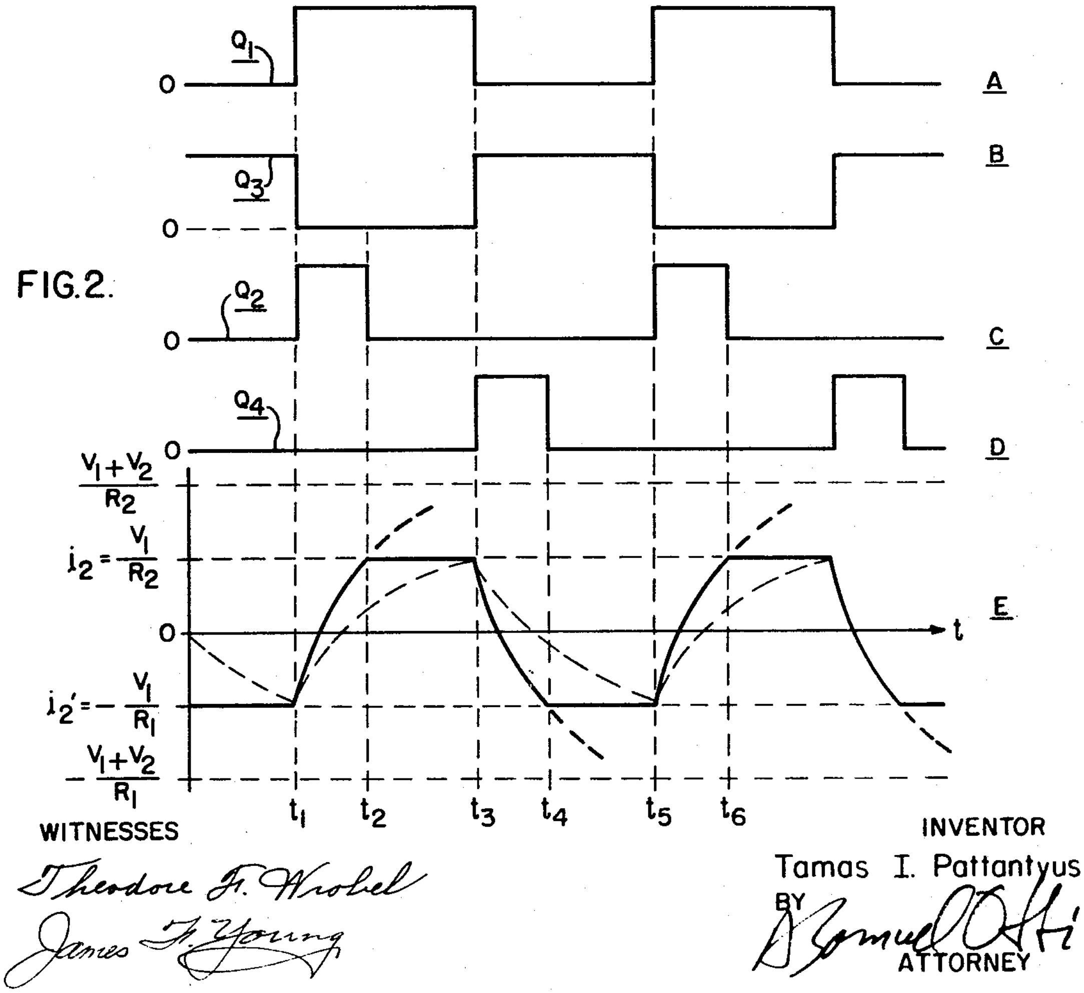
FIG. 2 is a waveform diagram including curves A, changing C, D and E used in explaining the operation of the circuit of FIG. 1.

Referring to the waveform diagrams of FIG. 2, at a time just prior to the time $t_1$, the curves A and B show the switching pulses applied to the terminals $T_1$ and $T_3$ of the transistors $Q_1$ and $Q_3$, respectively, are such that the transistor $Q_1$ is nonconductive and the transistor $Q_3$ is in its conductive, or saturated state. Both transistors $Q_2$ and $Q_4$ are nonconductive as shown in curves C and D, respectively. Under these conditions, separate current paths are provided from the $+V_1$ source via the resistors $R_1$ and $R_2$, with currents $i_1$ and $i_1'$ flowing, respectively, in the resistors $R_1$ and $R_2$, In that the transistor $Q_1$ is nonconductive, current $i_1$ through resistor $R_1$ will flow from left to right through the inductive element L as the current $i_2'$, through the collector emitter circuit of the conductive transistor $Q_3$ and the anode-cathode circuit of diode $D_2$ to ground. The current $i_1'$ through the resistor $R_2$ will pass directly through the transistor $Q_3$ and the diode $D_2$ to ground.

The resistors $R_1$ and $R_2$ are selected to have substantially identical resistance values. Transistors $Q_1$ and $Q_3$ are also selected to be identical types having substantially identical characteristics. The resistance of the inductive element L may be considered negligible as compared to the resistance of the resistors $R_1$ and $R_2$; therefore the current $i_1$ and $i_2'$ will be substantially equal to the current $i_1'$ through the resistor $R_2$.

Assuming that the resistors $R_1$ and $R_2$ are equal, then the magnitude of current $i_2'$ through the inductive element L will be:

$$i_2' = -V_1/R_1$$

at a time prior to the time $t_1$, which is shown in curve E of FIG. 2.

At the time $t_1$, it is desired to switch the current direction through the inductive element L from left to right to right to left as indicated by the current $i_2$ in FIG. 1. Therefore, at the time $t_1$, a positive going pulse (curve A) is applied to the base of transistor $Q_1$ to turn on this transistor and a negative going pulse (curve B) is applied to the base of transistor $Q_3$ to turn off this transistor. Simultaneously therewith a switching pulse (curve C) is applied to the terminal $T_2$ of the transistor $Q_2$ so as to turn it on. No positive going pulse is applied to the transistor $Q_4$ (curve D). With the transistors $Q_2$ turned on, the negative operating voltage $-V_2$ is connected therethrough to the inductive element L. The positive voltage $+V_1$ is connected to the inductive element L through the resistor $R_1$ and the transistor $Q_1$. Thus a total voltage of $V_1+V_2$ is provided to effect the change of direction of current through the inductor L. The emitter of the transistor $Q_1$ is unclamped from ground by the diode $D_1$ since diode $D_1$ is reversed biased by the application of the negative operating voltage $-V_2$ to the anode thereof via the collector-emitter circuit of the transistor $Q_2$.

As can be seen in curve E of FIG. 2, the current through the inductive element L at the time $t_1$ decreases towards zero exponentially and then begins to increase exponentially in the opposite direction, i.e., in the direction of current flow for the current $i_2$ in FIG. 1. Because of the connection of both of the operating sources $+V_1$ and $-V_2$ to the inductive element L, the current $i_2$ through the inductive element L wants to increase exponentially toward a current value $i_2$ which is equal to:

$$i_2 = (V_1+V_2)/R_2,$$

as shown by the dotted line in curve E of FIG. 2. Thus, the current $i_2$ will rapidly increase to its desired value $V_1/R_2$ reaching this value at the time $t_2$ as indicated in FIG. 2. The desired current $i_2$ equal to $V_1/R_2$, may be that required to saturate the particular recording media which may be associated with the inductive element L.

At the time $t_2$, the positive going pulse (curve C) is removed from the terminal $T_2$ of the transistor $Q_2$ thereby turning off the transistor $Q_2$, thus disconnecting the negative voltage $-V_2$ from the inductive element L. With the negative operating voltage $-V_2$ removed from the emitter of the transistor $Q_1$, the diode $D_1$ is forward biased thereby clamping the emitter of the transistor $Q_1$ to ground with the current through the inductive element L being fixed to the value $V_1/R_2$ at the time $T_2$, as indicated in curve E of FIG. 2.

The pulse length $t_2-t_1$ for the positive going pulse to the transistor $Q_2$ (curve C) is so selected that transistor $Q_2$ is turned off at the proper time to fix the current level $i_2$ at the value $V_1/R_2$, as desired. It can be seen that the increase of the current $i_2$ along the exponential as defined by the value $(V_1+V_2)/R_2$ causes the current $i_2$ to reach the desired value $V_1/R_2$ at a much sooner time than would otherwise be expected if only the single voltage source $+V_1$ were utilized. The exponential rise in current if only the single voltage source $+V_1$ were utilized is shown by the dotted curve P in curve E of FIG. 2 which demonstrates that the time required to reach the desired value $V_1/R_2$ would be greatly increased as compared to the time $t_2-t_1$ required in the present invention.

Between the times $t_2$ and $t_3$ the transistor $Q_1$ will remain conductive with current flow $i_2$ through the inductive element L in the direction indicated. The transistors $Q_3$, $Q_2$ and $Q_4$ are nonconductive during the time period $t_2$ to $t_3$.

At the time $t_3$ it is desired to reverse the current direction of the current through the inductive element L. This is accomplished by applying a negative going pulse (curve A) to the terminal $T_1$ of the transistor $Q_1$ and applying positive going pulses (curves B and C, respectively) to the transistor $Q_3$ and also to the transistor $Q_4$ thereby turning on the transistors $Q_3$ and $Q_4$ into saturation. The transistor $Q_2$ is maintained off during this switching operation. By turning on both transistors $Q_3$ and $Q_4$, a series connection is provided through the collector-emitter circuits thereof between the positive and negative voltages $+V_1$ and $-V_2$ and the inductive element L. The emitter of the transistor $Q_3$ is unclamped from ground by the reverse biasing of the diode $D_2$ by the negative voltage $-V_2$ applied to the anode thereof through the transistor $Q_4$. With the turning off of the transistor $Q_1$, a path will now be provided for the inductive element L through the transistors $Q_3$ and $Q_4$, 1decreasing exponentially from the value $V_1/R_2$ towards zero and then increasing in a negative direction toward the value $-(V_1+V_2)/R_1$, as defined by the dotted line so labeled on curve E of FIG. 2. The current through the inductive element thus rapidly reverses from the direction as indicated by the current $i_2$ to the direction as indicated by the current $i_2'$.

At the time $t_4$, the current $i_2'$ has reached the value $-V_1/R_1$, which is that desired for the inductive element L. At the time $t_4$, the positive going pulse (curve D) is removed from the terminal $T_4$ of the transistor $Q_4$, thereby causing this transistor to be turned off removing the voltage $-V_2$ from the inductive element L. The emitter of the transistor $Q_3$ is accordingly clamped to ground via the diode $D_2$ which is forward biased causing the current through the inductive element L to be stabilized at the value $-V_1/R_1$. The duration of the time period $t_4-t_3$ is the same as the time period $t_2-t_1$ since the circuit is symmetrical in both positive and negative current directions. The current $i_2'$ reaches the desired value of $-V_1/R_1$ at a time much sooner than would be expected if only a single voltage source $+V_1$ were utilized as indicated by slower exponential rise of the dotted curve P in curve E of FIG. 2 thus demonstrating the improved switching time as provided by the present invention.

At the time $t_5$, the cycle of operation repeats as was the case being with time $t_1$, with the operation continuing as described above.

It can thus be seen that a circuit for rapidly reversing the current direction through an inductor is provided. Even though the inductance value may be quite high, a rapid current reversal digital recording operation can be accomplished at the required high information rate demanded in such applications. Moreover, the transistors utilized need not have excessively high voltage ratings in that each transistor only sees either the positive or negative operating voltages when in its nonconductive state. However, when a current reversal is desired, the sum of the two operating voltages $(V_1+V_2)$ is utilized for effecting the rapid change of current directions. Moreover, the circuit, as shown, is an efficient one in that the transistors $Q_2$ and $Q_4$ are only switched on to supply power from the $-V_2$ voltage source during only the current reversal operation. The transistors $Q_1$, $Q_2$, $Q_3$ and $Q_4$ have been shown to be of the NPN type; however, it should be understood that PNP-type transistors could also be utilized with the proper changes of operating voltage polarity.

Although the present invention has been described with a certain degree of particularity, it should be understood that the present disclosure has been made only by way of example and that numerous changes in the combination and arrangement of parts, elements and circuitry can be resorted to without departing from the spirit and scope of the present invention.

What is claimed is:

1. In a circuit for reversing the current through an inductive element operative with first and second voltage sources, the combination of:

first and second translating devices operatively connected between said first source and a reference potential;

said inductive element being operatively connected between said first and second devices;

first means for turning on one of said first and second devices when turning off the other so that current is supplied to said inductive element in one direction when said first device is conductive and in the other direction when said second device is conductive;

third and fourth translating devices operatively connected between said first and second devices, respectively, and said second source;

second means for turning on said third or fourth device when said first or second device, respectively, is turned on to operatively connect said second source therethrough to said inductive element so that the current through said inductive element is rapidly reversed and for turning off the conductive of said third or fourth device when the reversed current reaches a predetermined magnitude; and first and second unidirectional devices operatively connected, respectively, between said first and second translating devices and said reference potential so that said first or second unidirectional device provides a conductive path to said reference potential therethrough when said first or second translating device, respectively, is conductive and blocks a conductive path to said reference potential when said third or fourth translating device, respectively, is conductive.

2. The combination of claim 1 wherein:

said first, second, third and fourth translating devices comprise transistor devices.

3. The combination of claim 2 wherein:

each of said transistor devices includes input and output electrodes, said inductive element being operatively connected between a first output electrode of said first and second devices, said first means including first and second input means operatively connected to said input electrode of said first and second devices, respectively, said second means including third and fourth input means operatively connected to said input electrodes of said third and fourth devices, respectively, a second output electrode of said first and second devices operatively connected to a first output electrode of said third and fourth devices, respectively, said first output electrode of said first and second devices operatively connected to said first voltage source, said second output electrode of said third and fourth devices, respectively, connected to said second source.

4. The combination of claim 1 wherein:

said inductive element is adapted for use in digital recording.